(12) United States Patent
Donner et al.

(10) Patent No.: US 7,860,295 B2
(45) Date of Patent: Dec. 28, 2010

(54) MEASURING METHOD AND MEASURING UNIT FOR DETERMINING THE SPATIAL POSITION OF A WHEEL RIM AS WELL AS A WHEEL ALIGNMENT MEASURING SYSTEM

(75) Inventors: Karin Donner, Salzweg (DE);
Hermann Bux, Adelzhausen (DE);
Stefan Schommer, Unterschleissheim (DE); Rudolf Engl, Ampfing (DE)

(73) Assignee: Beissbarth GmbH, Munich (DE)

( * ) Notice: Subject to any disclaimer, the term of this patent is extended or adjusted under 35 U.S.C. 154(b) by 939 days.

(21) Appl. No.: 10/563,746

(22) PCT Filed: Mar. 18, 2005

(86) PCT No.: PCT/EP2005/002940

§ 371 (c)(1),
(2), (4) Date: Apr. 2, 2007

(87) PCT Pub. No.: WO2005/090906

PCT Pub. Date: Sep. 29, 2005

(65) Prior Publication Data

US 2007/0283582 A1 Dec. 13, 2007

(30) Foreign Application Priority Data

Mar. 18, 2004 (DE) .................. 10 2004 013 441

(51) Int. Cl.
*G06K 9/00* (2006.01)
(52) U.S. Cl. .................. 382/141; 348/92; 700/109
(58) Field of Classification Search .......... 382/100, 382/103, 106, 107, 108, 141, 149, 151, 152; 348/86, 92, 94, 95, 135, 125, 136, 143, 148; 700/95, 98, 109, 110, 115, 117
See application file for complete search history.

(56) References Cited

U.S. PATENT DOCUMENTS 5,206,720 A * 4/1993 Clothiaux et al. .......... 348/95

(Continued)

FOREIGN PATENT DOCUMENTS

DE 29 48 573 6/1981

(Continued)

OTHER PUBLICATIONS

PCT Search Report for PCT/EP2005/002940, mailed Jun. 20, 2005, 3 pages.

*Primary Examiner*—Anand Bhatnagar
(74) *Attorney, Agent, or Firm*—Blakely, Sokoloff, Taylor & Zafman LLP.

(57) ABSTRACT

A method and a unit for determining the spatial position of a wheel rim with respect to a measuring unit having at least one camera, wherein the wheel rim lies in the viewing field of the camera, including making available of a model, that describes a model body of a localizable wheel rim geometry detail as well as the spatial position of the model body with respect to the measuring unit, through model parameters, capturing of a picture of the wheel rim geometry detail of the wheel rim with the camera, fitting the image of the model body resulting from the model parameters to the picture of the wheel rim geometry detail through changing the model parameters of the model, and tracking the changes of the model parameters upon the fitting, whereby the data related to the position of the model body of the wheel rim geometry detail reflect the spatial position of the wheel rim-geometry detail and, thereby, the wheel rim itself, when the image resulting from the model parameters, of the wheel rim-geometry detail fits to the captured picture of the wheel rim geometry detail within the asserted tolerance limits. The invention also relates to a wheel alignment measuring method and to a wheel alignment measuring system that uses said method and said unit.

31 Claims, 8 Drawing Sheets

U.S. PATENT DOCUMENTS

| | | | |
|---|---|---|---|
| 5,619,587 A * | 4/1997 | Willoughby et al. | 382/141 |
| 5,731,870 A * | 3/1998 | Bartko et al. | 356/139.09 |
| 6,323,776 B1 | 11/2001 | Jackson et al. | |
| 2008/0267441 A1 * | 10/2008 | Bux et al. | 382/100 |

FOREIGN PATENT DOCUMENTS

| | | |
|---|---|---|
| DE | 197 57 760 | 7/1999 |
| DE | 197 57 763 | 7/1999 |
| DE | 100 32 356 | 1/2002 |
| DE | 100 43 354.5 | 3/2002 |
| DE | 100 50 653 | 5/2002 |
| EP | 0 895 056 A | 2/1999 |
| EP | 1 184 640 A | 3/2002 |
| WO | WO 01/77617 A | 10/2001 |

* cited by examiner

MEASURING METHOD AND MEASURING UNIT FOR DETERMINING THE SPATIAL POSITION OF A WHEEL RIM AS WELL AS A WHEEL ALIGNMENT MEASURING SYSTEM

CROSS-REFERENCE TO OTHER APPLICATIONS

This is a National Phase of International Application No. PCT/EP2005/002940 filed on Mar. 18, 2005, which claims priority from German Patent Application No. 10 2004 013 441.3 filed on Mar. 18, 2004.

BACKGROUND OF THE INVENTION

1). Field of the Invention

The invention concerns a measuring method and a measuring unit for determining the spatial position of a wheel rim to a measuring unit, that includes at least one camera, wherein the wheel rim lies in the field of view of the camera, as well as a wheel alignment measuring method and a wheel alignment measuring system, in which the measuring units of such kind are used.

2). Discussion of Related Art

From DE 100 43 354.5 a wheel alignment measuring system with measuring heads is known for determination of the wheel positions of the wheels of a motor vehicle on a measuring site, wherein each measuring head shows at least one camera which is aligned to a measuring target arranged in the viewing field of the camera and positioned in a fixed relation to the wheel of the motor vehicle, and wherein the picture of the camera can be evaluated by an evaluation unit in order to determine the spatial position of the measuring target and thereby of the wheel with respect to the position of the camera or of the measuring body. The unit has an optical reference system integrated in the measuring heads for calibrating the measuring heads of the wheel alignment measuring system with respect to the position of the measuring heads to each other.

Wheel alignment measuring systems with measuring devices which include two cameras which are directed under different angles on targets on the wheels, are also known from DE 197 57 760, DE 197 57 763, DE 100 32 356 and DE 100 50 653.

In these so called contact-free wheel alignment measuring systems, measuring targets must be used since the spatial position cannot be determined from features of the wheel or the wheel rim itself with sufficient accuracy through the direct picture evaluation of the pictures of the wheel or the rim.

In the DE 29 48 573, it has been attempted to bring about the spatial position of the wheel through a circle or ellipse fit on the rim horn contour. This leads to systematic errors on account of the rounding of the rim horn particularly upon turning of the steering wheel. These errors follow as a consequence that it is erroneously supposed, that the rim contour would be the perspective picture of a spatial circle, while, in reality, no spatial circle is observed in perspective. Furthermore, in a two camera construction, both the cameras of the stereo system do not see the same spatial contour, but different contours.

SUMMARY OF THE INVENTION

The invention includes a method for determining the spatial position of wheel rim to a measuring unit, that includes at least one camera, wherein the wheel rim lies in the viewing field of the camera, including: making available of a model that describes a model body of a localizable wheel rim geometry detail as well as the spatial position of the model body to the measuring unit through model parameters, capturing of a picture of the wheel rim-geometry detail of the wheel rim with the camera, fitting of the picture of the model body resulting from the model parameters to the picture of the rim geometry detail through changing the model parameters of the model, and tracking the changes of the model parameters of the model upon the fitting, whereby the data related to the position of the model body of the wheel rim geometry detail reflect the spatial position of the wheel rim geometry detail and, thereby, of the wheel rim itself, when the image resulting from the model parameters of the model body of the wheel rim geometry detail matches to the captured picture of the wheel rim geometry detail within the asserted tolerance limits.

Through this method, the actual realities of the wheel alignment measurement, that is of the actual wheel rim, are taken into account in order to exactly determine the wheel plane spread out by the rim horn. The above mentioned systematic error in the common methods can, thereby, be avoided.

A further advantageous embodiment of the method according to the invention is characterized in that the model body is a so-called osculating torus or a 3D-CAD representation. While the osculating torus represents the simplest form of a 3-D model for the rim edge contour, a 3D-CAD representation of the respective rim can also be used whereby likewise good results can be achieved.

A further advantageous embodiment of the method according to the invention is characterized in that in case of the osculating torus model parameters of the model are a primary radius R and a secondary radius r of the torus, a position c of the torus center, a normal vector n of the plane of rotation of the torus and a position z of the projection center of an aperture camera, with which the osculating torus is viewed. From these model parameters of the osculating torus, some are known from the actual dimensions of the wheel rim and from the arrangement of the aperture camera, so that the number of unknowns in the resulting optimisation problem is reduced in an advantageous manner and the fitting of the image of the osculating torus on the picture of the actual rim is made easier.

A further advantageous embodiment of the method according to the invention is characterized thereby that the wheel rim geometry detail is the rim edge contour. Though other wheel rim geometry details also can be considered as the basis for the determination of the spatial position of a wheel rim, the rim edge contour is a preferred feature, as a sufficiently good contrast between the wheel rim and the tires is to be expected there.

A further advantageous embodiment of the method according to the invention is characterized in that the wheel rim contour is captured with two cameras which are directed under different angles to the wheel. As will be shown later, one camera would, in principle, be sufficient as the basis for the execution of the measurements according to the invention. Two cameras are, however, advantageous in respect of an error correction in order to obtain a higher degree of accuracy of the measurement.

A further advantageous embodiment of the method according to the invention is characterized in that the picture of the wheel rim is also used for determining of an angular rotation reference point on the rim, which serves as an angular starting point upon carrying out the rotation of the wheel. From the rotation angle and the normal vector of the rim edge plane, the true axis of rotation can be determined exactly.

A further advantageous embodiment of the method according to the invention is characterized in that, for determining of the rotation angle reference point on the rim, the position of a characteristic feature on the wheel is used, wherein, in an advantageous manner, as a characteristic feature for determining the rotation angle starting point, a characteristic feature of the rim or an air valve of the wheel is used. As a characteristic feature of a motor vehicle wheel which shows the rotational position of the wheel, is the air valve, this can be used without further measures on the wheel as a characteristic feature. A marker could also be used to mark a rotation angle determination point on the rim, wherein again a contact with the wheel would be necessary. In practice it has been shown that the localization of the air valve is sufficient for the purpose of the present measurement.

A further advantageous embodiment of the method according to the invention is characterized thereby that, for segmentation of the perimeter of the rim, a pre-segmentation and a fine segmentation (sub pixel segmentation) is carried out. This manner of procedure, in an advantageous manner, makes possible a simplification of the required arithmetical operations in order to be able to carry out the segmentation with sufficient accuracy.

A further advantageous embodiment of the method according to the invention is characterized in that the data with respect to the model parameters of the model, which define the spatial position of the wheel rim when the image of the model body of the wheel rim geometry detail fits to the captured picture of the wheel rim-geometry detail, are output or indicated.

A further advantageous embodiment of the method according to the invention is characterized through the following steps: starting of the picture shooting, segmentation of the rim wherein a segmentation of the air vent of the motor vehicle wheel is carried out, segmentation of the rim edge in order to measure the asserted angle range of the rim edge, reconstruction of the 3-D position of the rim edge, displaying the result of the calculation, namely of the normal vector and of the central point of the rim edge plane and/or storing the same for the further calculation. Through this arrangement, a rim run-out compensation is possible in an advantageous manner.

A further advantageous embodiment of this method according to the invention is characterized in that, after the start of the picture shooting, it is examined at first whether the illumination is sufficient for the measurement, and that the illumination is adjusted accordingly.

A further advantageous embodiment of the method according to the invention is characterized in that the adjustment includes a larger or smaller intensity of the light for the illumination.

The measuring unit according to the invention for determining the spatial position of a wheel rim to the measuring unit that includes at least one camera, wherein the wheel rim lies in the field of view of the camera, is characterized by a computer which is programmed to execute one of the methods described above.

An advantageous embodiment of the measuring unit according to the invention is characterized in that, in the above measuring unit, two cameras are provided which capture the wheel rim contour and are directed to the wheel under different angles.

A further advantageous embodiment of the measuring unit according to the invention is characterized in that each camera includes an optical sensor, an objective, an aperture setting unit and a focus setting unit, and that the mounting position of the sensors and of the objective, the aperture setting and focus setting are pre-adjusted.

A further advantageous embodiment of the measuring unit according to the invention is characterized in that, in case of Zoom-objectives, furthermore the set focal length is pre-adjusted.

A further advantageous embodiment of the measuring unit according to the invention is characterized in that an output or display system, respectively, is provided for outputting or displaying, respectively, the data with respect to the model parameters, which define the spatial position of the wheel rim, when the image of the model body of the wheel rim-geometry detail fits to the captured picture of the wheel rim geometry detail. Thereby, the installation of the measuring site is made easier, as the fine adjustment of the reference systems can be carried out anew at any time.

Essentially the advantages of the measuring unit according to the invention or its embodiments correspond to the advantages of the method according to the invention or its embodiments which have been described above.

The method according to the invention for the wheel alignment measurement on motor vehicles is characterized in that one of the above mentioned methods for determining of the spatial position of a wheel rim to a measuring unit on the wheel of the motor vehicle is executed, that the relative positions of the measuring unit for the execution of the measurements are determined, that the measuring results of the measurements on the wheels of the motor vehicle are expressed in terms of wheel position values taking into account the relative positions of the measuring units, and that the wheel position values are output or displayed.

An advantageous embodiment of the method according to the invention is characterized in that the relative positions of the measuring units for execution of the measurements are fixed through an adjustable mounting of the measuring units on a measuring site.

A further advantageous embodiment of the method according to the invention is characterized in that the relative positions of the measuring units for execution of the measurements are determined through a reference system that is arranged on the measuring units.

A further advantageous embodiment of the method according to the invention is characterized through the following steps: execution of the measurements of the individual measuring units; entering of the measuring results into a computer; calculation of the transformation matrix from the results of the reference system measurement; transforming the result vectors of the measuring units into the arithmetic coordinates system through offset angles and distances from the reference measuring system; determination of the wheel position values in the arithmetic coordinates system through evaluation of the position of the result vectors to each other for calculation of the corresponding wheel alignment measurement values; presenting of the results to the wheel position angle values to a display system and/or storing of the same for further use.

The advantages of the method according to the invention for wheel alignment measurement on motor vehicles and the advantageous embodiments lie therein that, the measuring units described above and the corresponding method can be used in an advantageous manner for the accurate measurement of the entire running gears arrangement with motor vehicles.

A wheel alignment measuring system for motor vehicles according to the invention is characterized by measuring units for determining the spatial position of a wheel rim to a measuring unit at the wheels of the motor vehicle in which measuring units are positioned on a measuring site in such a manner that a measuring unit is associated with each one of the wheels of the motor vehicle whereby the relative positions of the measuring units are determined during the execution of the measurements, a computer which processes the measurement results of the measurements on the wheels of the motor vehicle to wheel position values taking into account the relative positions of the measuring units, and by an output or display unit with outputs or displays the wheel position values.

An advantageous embodiment of the wheel alignment measuring system according to the invention is characterized thereby that the relative positions of the measuring units for execution of the measurements are fixed through an adjustable mounting of the measuring units at a measuring site.

An advantageous embodiment of the wheel alignment measuring system according to the invention is characterized in that the relative positions of the measuring units for execution of the measurement are determined through a reference system, that is arranged on the measuring units.

An advantageous embodiment of the wheel alignment measuring system according to the invention is characterized in that, upon combined assembly of two cameras in a measuring unit for a stereo-measuring system, the cameras are calibrated with respect to the coordinates system of the measuring unit.

The advantages of the wheel alignment measuring system for motor vehicles according to the invention correspond to those, which had been described in connection with the method for wheel alignment measurement on motor vehicles.

BRIEF DESCRIPTION OF THE DRAWINGS

Embodiments of the invention are now described with reference to the enclosed drawing in which.

DETAILED DESCRIPTION OF THE INVENTION

Figure 1:
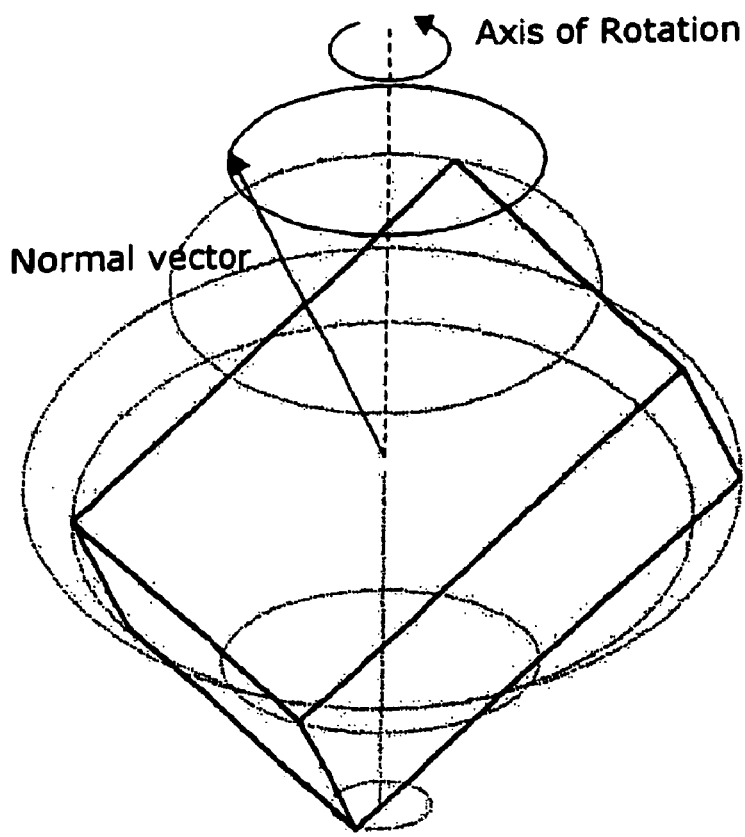
FIG. 1 shows a schematic representation of a rotating body with a normal vector of a marked plane.

Determination of the Spatial Position of a Rotating Body.

When, for determining of the spatial position of a rotating, especially rotation symmetric body, neither targets nor marks are applied to the body and the rotating body does not have well trackable points from the beginning, localized geometry details can be captured in the following way and manner. One ascertains distinctive geometry details (for instance points, edges, surfaces) of the rotating body in space through an algorithmic reconstruction from preferably perspective pictures of the body. One tracks these distinctive geometry details during the rotation of the body. 3D points then move on circular paths in space, edges and surface normals describe rotation surfaces around the true axis of rotation.

To this end, first of all, a preferably parameterized 3D model is used that describes a good localizable part of the real geometry of the rotating body. Such a 3-D model can be, for example, cuboids, cylinders, circular surfaces or even complete 3D-CAD-designs. Depending on the position in space and the parameters of the 3D model, one can calculate the perspective picture of the 3D model. If, in return one now has a perspective picture of the 3D model, one can determine the spatial position and the structural parameters of the 3-D model. As a suitable picture section of the real body must correspond exactly to this perspective picture of the 3D model, one thus obtains a 3-D model algorithmically fitted into the given body.

If the true axis of rotation of the original body is not at the same time a symmetry axis of rotation of the fitted 3-D model, one can calculate the rotary position of the original body from the position of the fitted 3-D model. Thus the normal vectors of an osculating plane not being perpendicular to the axis of rotation during the rotation of the original body, describe for instance a circle-cone the center of which is the axis of rotation, as is evident from FIG. 1.

If the axis of rotation is determined once, one can then deduce the position of the axis of rotation through measurement of the marked plane even if the position of the rotating body should have changed in the meantime. In connection with the wheel alignment measurement, this basic idea leads to the question as to how one can obtain an adequately general, localized 3-D model for the different rim geometries.

With sufficiently comprehensive, parameterized 3-D models, this procedure requires fundamentally only one perspective view for the reconstruction of the geometry. Several cameras can however be preferred on grounds of increased accuracy.

Application to the Determination of the Spatial Position of a Rim

The spatial position of an object can then be obtained from perspective pictures even if indeed one has no trackable uniform spatial contours or well marked points at disposal but sufficient side knowledge about the, in principal possible, geometry in the form of a parameterized 3D model. This will be exemplarily carried out on the example of the 3D model of a ring surface. Similar approaches are, however, also possible with other local 3D models. In particular for the wheel alignment measurement by means of rim horn approximation, also generalized ring geometries are worthy of consideration. The cross section curves of such generalized ring surfaces are then circular arcs, i.e. piece wise smooth curves composed out of circular arcs.

If extended knowledge about the rim geometry is at hand (for instance a CAD-design), an essentially more complex 3D model can also be fitted to the rim geometry wherein then regions apart from the rim horn also become worthy of consideration for the approximation.

As all rims in the edge range to the tire locally show a ring shaped geometry, a local ring surface is fitted here in the range of the rim edge such that the edge contours of the rim as seen by the camera and the aforesaid fitted ring surface become the same. Such a ring surface corresponds to an osculating surface in the area of the rim horn, more precisely to the so called extreme shadow border line from the view of the camera.

Figure 2:
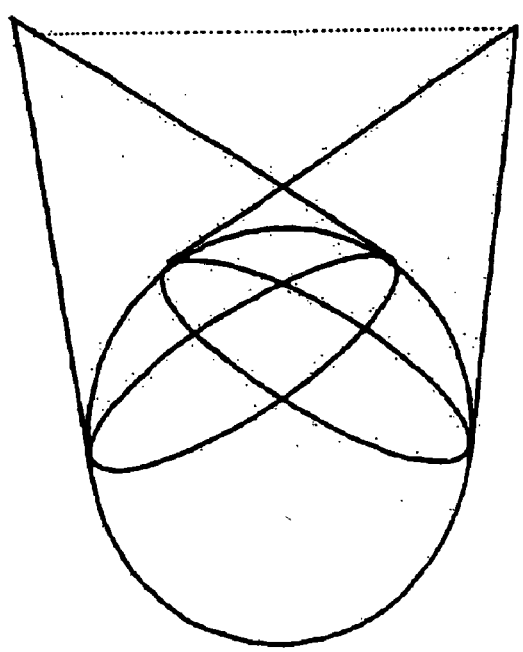
FIG. 2 shows a schematic representation to how the shadow border lines change with a change of the source of light where a sphere is taken as example.

If one illuminates a given spatial body with a punctiform light source one obtains as quantity of border points between illuminated and un-illuminated regions on the spatial body a combination group of curves, the shadow border lines. If one connects each point of a shadow border line with the source point of light through a straight line, a boundary beam cone results, as is shown in FIG. 2.

With punctiform illumination of a typical rim from the viewing side thereof, there is exactly one shadow border line whose boundary beam cone contains all other boundary beam cones which for example can be caused by recesses in the rim. This shadow border line corresponds to the outer contour of the rim and is designated as extreme shadow border line. If one substitutes the punctiform light source through an aperture camera whose projection center coincides with the previous light source point, then the perspective picture of the extreme shadow border line appears as edge contour against the background, for example the tires.

The extreme shadow border line of a ring surface or a rim is in general no even spatial curve, especially no circle, except if the projection center lies on the axis of rotation of the ring surface or rim. The perspective picture is, as a rule, no ellipse. For two aperture cameras with different projection centers the extreme shadow border lines are different (FIG. 2). This means, that an interpretation of the edge contour as picture of a unitary spatial curve and, therefore, a usual stereo reconstruction by means of epipolar conditions must necessarily lead to faulty reconstructions.

The extreme shadow border line of a rim indeed varies according to observer position and turning angle of the wheel, but it lies typically in the range of the strongest curvature of the cross sectional curvature of the rim horn. In this range, rims are rotational and can be approximated very well by a ring surface which is designated as osculating torus. From the view of the aperture camera, the shadow border line of this ring surface coincides with the shadow border line of the rim. The symmetry plane which is perpendicular to the symmetry axis of rotation of the osculating torus is designated in the following as osculating torus plane or rim edge plane.

Figure 3:
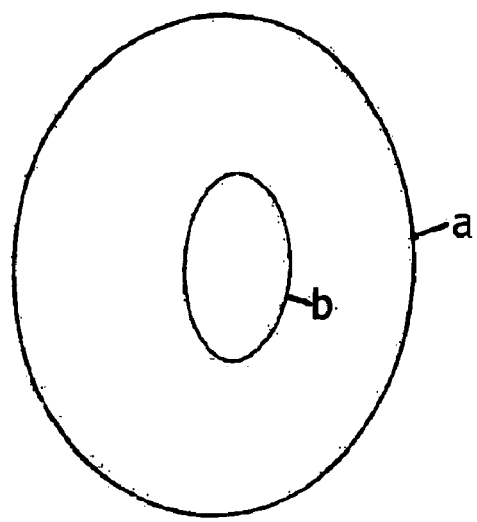
FIG. 3 shows a schematic representation of an edge contour or the shadow border line of a ring surface.
Figure 4:
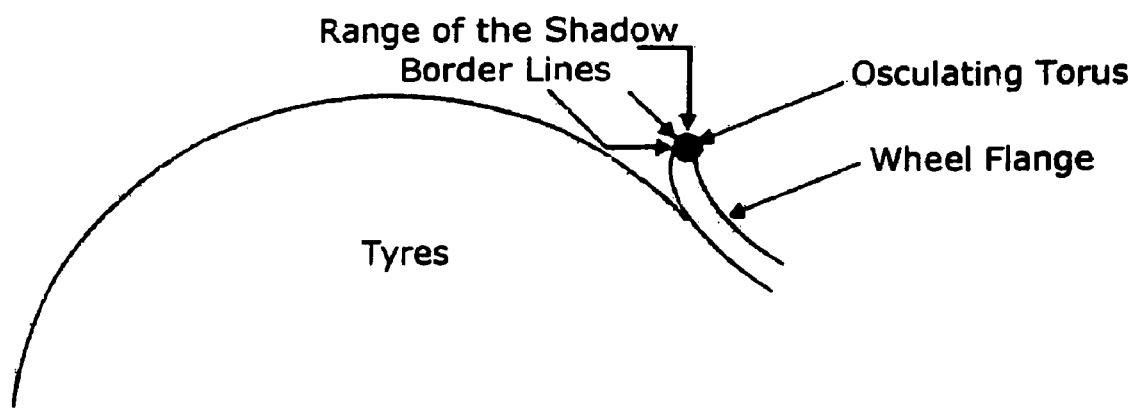
FIG. 4 shows a schematic representation of a cross section through the rim horn zone of a motor vehicle wheel with marked position of the cross section circle of the osculating torus.

FIG. 3 shows the edge contours or perspective pictures of the shadow border line, respectively, of a ring surface. The outer contour a is the picture of the extreme shadow border line. The inner contour b would correspond to the ring aperture. FIG. 4 shows a cross section through the rim horn zone of a motor vehicle wheel with the position of the cross section circle of the osculating torus being drawn in. The extreme shadow border line passes in the area marked with arrows, wherein it traverses the cross sectional plane. Thus, the extreme shadow border line of the osculating torus from the respective perspective view is used as a 3-D model to be fitted. However, the parameters of the extreme shadow border line of the osculating torus also unambiguously determine the osculating torus itself.

In the following, the calculation of the contour curves of the perspective picture of a ring surface is described. In order to describe the shadow border line of a ring surface mathematically completely, a cylinder coordinates system is oriented such that the rotation plane of the ring surface becomes the $(r,\phi)$-plane and the axis of rotation becomes the z-axis. Given are a torus T with a central circular radius R and an intersecting circular radius r for a sectional plane extending through the axis of rotation of the torus, centered around $0=(0,0,0)$ with the axis of rotation in the direction $e_3=(0,0,1)$, $r<R$, that means that the central circle of the torus lies in the x-y plane. Further, $z=(\zeta_1, \zeta_2, \zeta_3)$ should designate a central perspective projection center in the outer area of the torus with $\zeta_3<r$, as well as E is a projection plane (equal to the chip plane of the camera), where z is not contained in E. If u is the perpendicular nadir of z in the projection plane E and $(n_1, n_2, n_3)$ is an orthogonal basis such that $$n_3 = \frac{z-u}{\|z-u\|}$$

($\|z-u\|$=distance of z and u), $(u, n_1, n_2)$ becomes the affine picture coordinates system in the projection plane, which means that the direction of the optical projection center is perpendicular to the retina plane of the optical axis of the affine coordinates system.

It is known:
(1) for each point $x=(\xi_1, \xi_2, \xi_3) \in T$, there is accurately one angle $\phi \in [0, 2\pi[$ in such a way that $$\xi_1 = \sqrt{\xi_1^2 + \xi_2^2} \cos\varphi$$
$$\xi_2 = \sqrt{\xi_1^2 + \xi_2^2} \sin\varphi$$

$\phi$ is called "the polar angle belonging to x".
(2) for each angle $\phi \in [0, 2\pi[$ there are points $x \in T$ with the following attributes:
 (a) $\phi$ is the polar angle belonging to x,
 (b) z-x is the tangential vector on T in point x, i.e. x is the T-touching point of a straight line through z.

Therefore, x is a point on the shadow border line of T with reference to the projection center z. Among all points with the attributes (a) and (b) $s_{100}$ is supposed to be the one with the largest distance from zero point (extreme shadow border line point !).

For determining $s_\phi$, designate $E_\phi$ as the plane through $e_3$ and through the unit vector $a_\phi=(\cos\phi, \sin\phi, 0)$ being perpendicular to $e_3$. All points $x \in T$ with the polar angle $\phi$ lie in $E_\phi$. Specially $s_\phi \in E_\phi$ is valid. The tangential plane to T in the point $s_\phi$ is perpendicular with respect to $E_\phi$. In particular, the cross section g of this tangential plane with $E_\phi$ is the tangent in the point $s_\phi$ on the torus intersection circle K with the equation $$(\xi-R)^2+\eta^2=r^2$$

for points $\xi a_\phi+\eta e_3$ in $E_\phi$. The orthogonal projection point $z_\phi$ of z in $E_\phi$ (orthogonal projection on $E_\phi$ !) lies on this tangent (compare FIG. 5).

If $\langle z|v \rangle$ designates the scalar product of a vector v and the vector z, one obtains by calculating the orthogonal projection:

$$z_\phi = \langle z|a_\phi \rangle a_\phi + \langle z|e_3 \rangle e_3 = (\zeta_1 \cos\phi + \zeta_2 \sin\phi) a_\phi + \zeta_3 \cdot e_3$$

In order to determine the coordinates $\alpha_\phi$, $\gamma_\phi$ of $s_\phi$ with reference to the basis $(a_{\phi,e_3})$ of the plane $E_\phi$, one should note that the tangent g touches the intersection circle K. A point $\xi \cdot a_\phi + \eta \cdot e_3$ in $E_\phi$ lies exactly then on the tangent g on K in the point $s_\phi = \alpha_\phi a_\phi + \gamma_\phi \cdot e_3$ ($\alpha_\phi$, $\gamma_\phi$ still to be determined !) when $$(\xi - R)(\alpha_\phi - R) + \gamma_\phi \eta = r^2.$$

The point $z_\phi$ must lie on this tangent. Thus it is valid:

$$((\zeta_1 \cos\phi + \zeta_2 \sin\phi) - R)(\alpha_\phi - R) + \zeta_3 \cdot \gamma_\phi = r^2$$

and $$(\alpha_\phi - R)^2 + \gamma_\phi^2 = r^2.$$

If one sets $\rho_\phi \stackrel{def}{=} \zeta_1 \cos\phi + \zeta_2 \sin\phi - R$, one obtains from $$\zeta_3^2(\alpha_\phi - R)^2 + \zeta_3^2 \gamma_\phi^2 = \zeta_3^2 r^2 : \zeta_3^2(\alpha_\phi - R)^2 + (r^2 - \rho_\phi(\alpha_\phi - R))^2 = r^2 \zeta_3^2.$$ It follows $$(\alpha_\phi - R)^2(\zeta_3^2 + \rho_\phi^2) - 2(\alpha_\phi - R) \cdot \rho_\phi \cdot r^2 = r^2(\zeta_3^2 - r^2).$$

One obtains $$\alpha_\varphi - R = \frac{\rho_\varphi r^2}{\zeta_3^2 + \rho_\varphi^2} \pm \sqrt{r^2 \frac{\zeta_3^2 - r^2}{\zeta_3^2 + \rho_\varphi^2} + \frac{\rho_\varphi^2 r^4}{(\zeta_3^2 + \rho_\varphi^2)^2}}$$

$$= r \cdot \frac{\rho_\varphi r \pm |\zeta_3| \sqrt{\zeta_3^2 + \rho_\varphi^2 - r^2}}{\zeta_3^2 + \rho_\varphi^2}.$$

Figure 5:
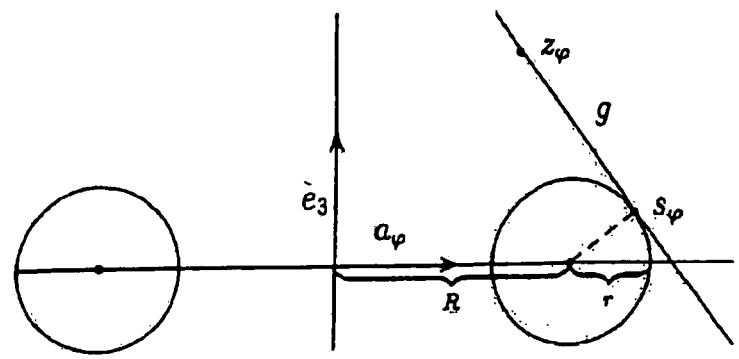
FIG. 5 shows a schematic representation of an intersection picture of the torus in the intersection plane $E\phi$.

As $s_\phi$ is the touching point with largest norm in the representation of FIG. 5, one obtains:

$$\alpha_\varphi = R + r \cdot \frac{\rho_\varphi r + \zeta_3 \sqrt{\zeta_3^2 + \rho_\varphi^2 - r^2}}{\zeta_3^2 + \rho_\varphi^2}$$

and $$\gamma_\varphi = \frac{1}{\zeta_3}\left(r^2 - \rho_\varphi \cdot r \frac{\rho_\varphi r + \zeta_3 \sqrt{\zeta_3^2 + \rho_\varphi^2 - r^2}}{\zeta_3^2 + \rho_\varphi^2}\right)$$

$$= \frac{1}{\zeta_3(\zeta_3^2 + \rho_\varphi^2)}\left(\zeta_\varphi^2 r^2 - \zeta_3 \sqrt{\zeta_3^2 + \rho_\varphi^2 - r^2} \cdot \rho_\varphi \cdot r\right)$$

$$= \frac{r\left(r\zeta_3 - \sqrt{\zeta_3^2 + \rho_\varphi^2 - r^2} \cdot \rho_\varphi\right)}{\zeta_3^2 + \rho_\varphi^2}.$$

The functional equation of the extreme shadow border line curve (as a function of $\phi$), which contains the points of the shadow border line, is, therefore, $\phi \rightarrow s_\phi = \alpha_\phi a_\phi + \gamma_\phi e_3$ with these insertions for $\alpha_\phi$ and $\gamma_\phi$.

In order to ascertain the central perspective picture of the extreme shadow border line i.e. the edge contour, one requires at first the central projection p into the projection plane E with the projection center z.

For each point x of the space that does not lie on the plane parallel to E through z, it is valid:

$$\frac{p(x) - u}{\|z - u\|} = \frac{x - z - \langle x - z | n_3 \rangle n_3}{\langle x - z | n_3 \rangle}.$$

Herein $\|z - u\|$ is the length of the vector $z - u$, thus the distance of the projection center z from the projection plane E, and $\langle x - z | v \rangle$ again denotes the scalar product of $x - z$ with a vector v.

It follows $$p(x) = u + \frac{\|z - u\|}{\langle x - z | n_3 \rangle} \cdot (\langle x - z | n_1 \rangle n_1 + \langle x - z | n_2 \rangle n_2)$$

as $x - z = \langle x - z | n_1 \rangle n_1 + \langle x - z | n_2 \rangle n_2 + \langle x - z | n_3 \rangle n_3$ By inserting $s_\phi$ into p, one obtains the edge contour: $\phi \rightarrow p(s_\phi)$ in Cartesian coordinates.

In picture coordinates of the projection plane E $$\varphi \rightarrow \begin{pmatrix} \langle p(s_\varphi) - u | n_1 \rangle \\ \langle p(s_\varphi) - u | n_2 \rangle \end{pmatrix} = \frac{\|z - u\|}{\langle s_\varphi - z | n_3 \rangle} \cdot \begin{pmatrix} \langle s_\varphi - z | n_1 \rangle \\ \langle s_\varphi - z | n_2 \rangle \end{pmatrix}$$

is the functional equation of the edge contour, i.e. the shadow border line.

It is to be noted that the functional equation of the edge contour depends not only on r and R but also on the relative position of z and E with respect to the torus T. If one keeps z and E fixed and moves the torus, one obtains the same edge contour as one would have if one had left the torus in normal position, but moved z and E inversely. The shape of the edge contour thus determines the relative position of the main plane of the torus with respect to the camera coordinates system $(n_1, n_2, n_3)$.

One sets, after fixing of the normal vector of the retina plane and of the focus distance of the projection center of the retina plane, over the hereby fixed central projection p. The edge contour point belonging to $\phi$ is then $p(s_\phi)$, which can be expressed as described above.

It is to be noted, that the inherent parameters of this central projection, namely the position z of the projection center, the focus distance and the normal vector of the retina plane, are obtained in the course of a calibration of the camera. They are therefore known prior to the measuring process.

The aim of the calculation explained in the following, is the reconstruction of the osculating torus surface from the edge contour, i.e. the perspective view of the extreme shadow border line on the rim horn. To this end, the model parameters of the osculating torus (in the course of a non-linear optimizing routine) are altered until the outer contour of the osculating torus comes to match the measured extreme shadow border line of the rim. The normal vector of the rotation plane of the osculating torus can then be used for a precise reconstruction of the axis of rotation.

The reconstruction of the osculating torus from the edge contour can be formulated as a non linear optimization problem. The extreme shadow border line of a ring surface depends on the following parameters: primary radius R and secondary radius r of the torus, position c of the torus center and normal vector n of the rotation plane of the torus with respect to the camera coordinates system $(n_1, n_2, n_3)$, as well as on the position z of the projection center of the aperture camera. As z is determined beforehand through calibration, this dependency will not be mentioned in the following anymore. Except as to a coordinates transformation of the normal vector n onto the z-axis and of the torus center c into the origin, the equation of the extreme shadow border line has been derived above.

In order to express the dependency of this representation from the parameters R, r, c and n, one considers the contour point $p(s_\phi)$ as a function. This results from the above mentioned representation of $p(s_\varphi)$, when one carries out the conversion of the camera coordinates into the coordinates system used above beforehand.

If one has now ascertained a sufficient plurality of edge contour points $x_1, \ldots, x_n$ from the central perspective picture of the aperture camera and if the camera parameters and, thereby, the positions of the projection center z, the main point u as well as the camera coordinates system $(n_1, n_2, n_3)$ (se apendix 1) are known from a calibration carried out beforehand, one searches for parameter vectors c and n as well as radii r and R such that, for suitable polar angles $\varphi_1, \ldots, \varphi_n$ associated to $x_1, \ldots, x_n$, the error square $$\sum_{i=1}^{n} \|f(R, r, c, n, \varphi_i) - x_i\|^2$$

becomes a minimum. Herein, $\|y-z\|$ denotes the Euclidian distance of two points y,z in the picture plane.

With known osculating torus radius R, this can be set fixed and thereby be eliminated as an unknown. The ascertaining of the angle arguments $\varphi_1, \ldots, \varphi_n$ belonging to the edge points $x_1, \ldots, x_n$ would have to be included, in an ideal case, in its part into the overall minimization. In the present case, however, a good pre-approximation heuristic is sufficient in order to provide these angle arguments with high precision. While the normal vector n of the osculating torus plane is also ascertainable clearly from a perspective, this is no more valid for c, r, R. With known R, however, one mono camera view is sufficient.

Also because of the higher error stability, especially at an observer position in the vicinity of the axis of rotation of the rim, two cameras in precisely measured spatial position (stereo system) are used. The above square sum is then to be provided with a similar error term for the second aperture camera.

For a sufficiently precise determination of the edge contours of the rim against the tire background, normal contour extraction methods of the picture processing are not sufficient because of the often poorly pronounced contrast of the outer side of the rim horn against the tires. Hence refined contour estimators are used while including the side knowledge about the border geometry features of the torus.

If the wheel axis of rotation in space is altered, the wheel carries out a free movement in space (translation and rotation). As the relative position of the axis of rotation in relation to the fitted-in 3D model in a wheel alignment measurement remains constant, one can infer from the position of the axis of rotation back to the position of the fitted 3D model. If the fitted-in 3D model has additional symmetries, one requires position identifying parameters. A polar angle indication in the osculating torus plane is necessary with an osculating torus for this purpose.

This polar angle can, for instance, be determined by capturing the rotary position of the wheel air valve. In principle, however, many other ways of ascertaining the rotation angle are possible. On account of the, as a rule, rather negligible deviation of the center of the osculating torus with respect to the axis of rotation of the wheel, for determination of the axis of rotation position in space, an accuracy of this rotation angle somewhat below 1 angle degree is adequate in general.

As already mentioned, the shadow contours of the rim are different to each other depending on the perspective observation position, as explained with reference to FIG. 2. It is then evident from FIG. 6 that this leads to a faulty reconstruction through classic stereo matching in case of a ring shaped geometry. The intersection points of the viewing beams of edge contours do not lie on a parallel in relation to the torus plane. The edge contours seen by both the cameras originate for different viewing positions from different spatial curves. Therefore, if one executes a classic stereo reconstruction (through intersection of the presumed viewing beams) in the erroneous assumption that one and the same spatial curve is concerned, one arrives at faulty reconstructions of spatial curves not lying on the rim, which one assumes to be the real rim edge. The fitting plane of such a seeming rim edge curve does, in general, not correspond to the above described osculating torus plane. In particular with a more pronounced turning angle of the steering wheel, the deviations of the respective normal vector are no longer to be neglected.

The Wheel Alignment Measuring System.

Figure 6:
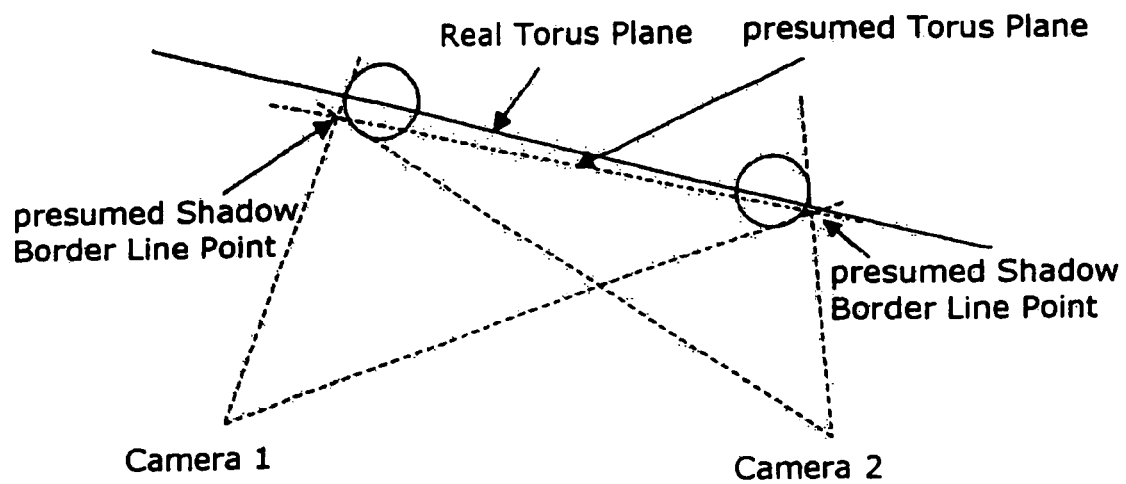
FIG. 6 shows a schematic representation of a fault reconstruction through classic stereo matching with a ring shaped object geometry in the sectional picture.
Figure 7:
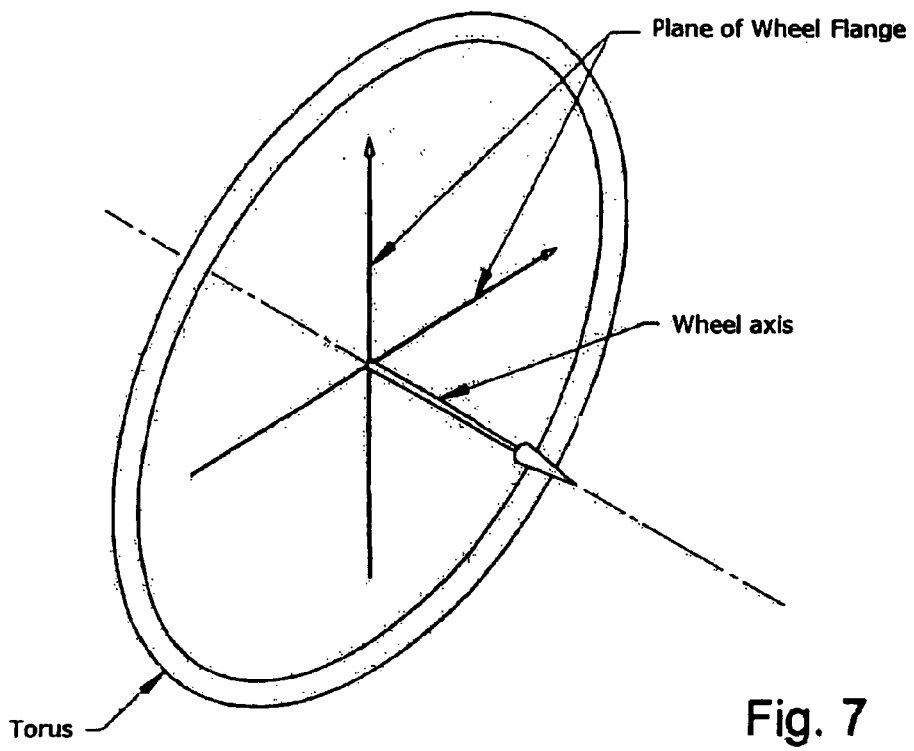
FIG. 7 shows a schematic representation of torus, wheel axis and wheel middle plane at a motor vehicle wheel.

FIG. 6 shows the geometric relationships which have been represented in general with reference to FIG. 1, with respect to the relationships at a rim or to a wheel for a motor vehicle respectively. When the torus is fitted on the rim edge, the torus plane is the rim edge plane. This is can also be reconstructed with high accuracy in connection with the rotated wheel. It is thus a distinctive plane of the wheel. The supposition, that the normal vector of this plane is a vector in the direction of the axis of rotation, is, however, false in general (rim run-out!). However, by rotating the wheel at controlled rotation angles, the normal vector of the rim edge will move on a rotational cone around the true axis of rotation. From at least three such rotational positions the true axis of rotation of the wheel can now be calculated and its spatial angle position to the normal vector of the rim edge plane can be given. This fixed, constant relationship between the normal vector of the rim edge plane and the axis of rotation allows later to determine precisely the axis of rotation from the knowledge of the rim edge plane and of the rotation angle of the wheel alone.

Only with wheels the run-out free mounting of which is guaranteed through the manufacturing technology, the normal vector of the rim edge plane con be taken to be equal to the true axis of rotation vector. In any case the rim edge plane must be determined for ascertaining the axis of rotation.

In an ideal rim, the position of the torus center is to be looked at as breakthrough point of the wheel axis of rotation through the representative rim plane, and it yields, together with the normal vector, the measuring result of the stereo system.

Figure 8:
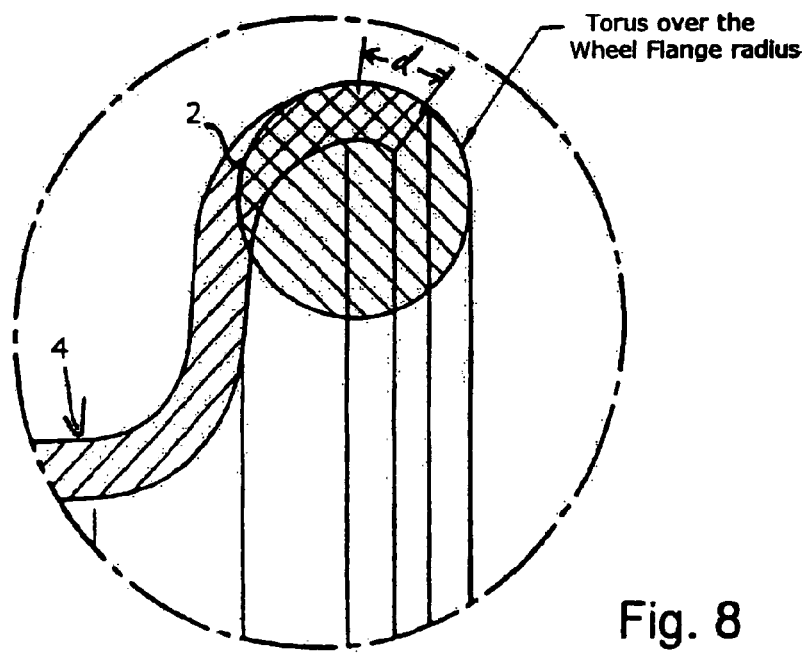
FIG. 8 shows a schematic representation of the torus to the rim horn at a motor vehicle wheel.

FIG. 8 schematically shows the rim horn 2 of a rim 4. As is evident, the rim horn radius is represented in good approximation by the torus in the range which is captured by a camera arranged to the side of the rim edge.

Figure 9:
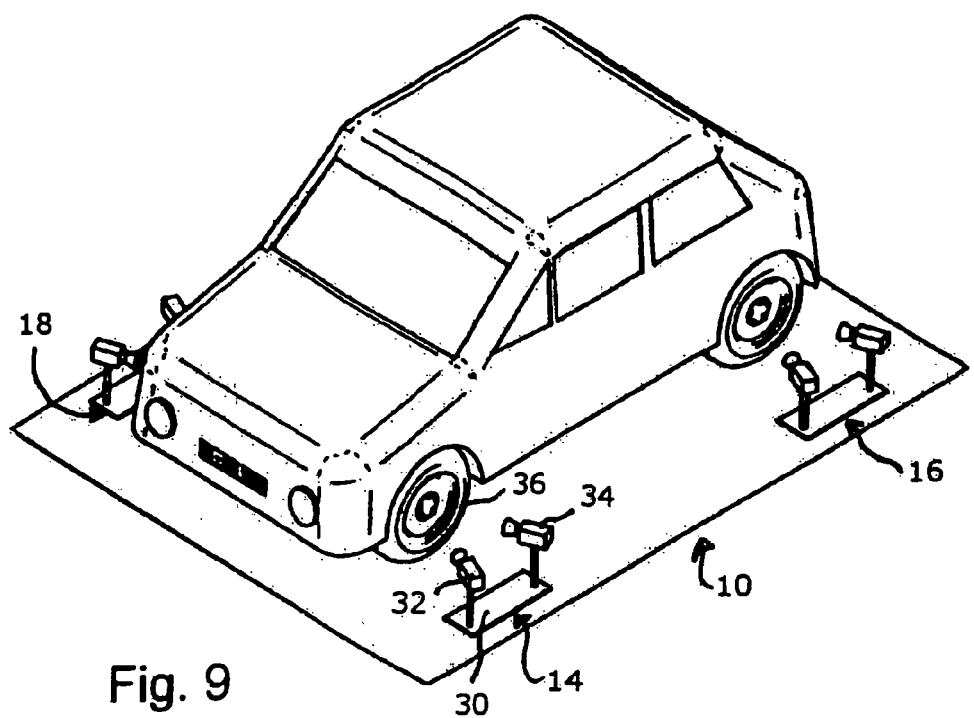
FIG. 9 shows a schematic representation of a wheel alignment measuring system with stationary measuring units.
Figure 10:
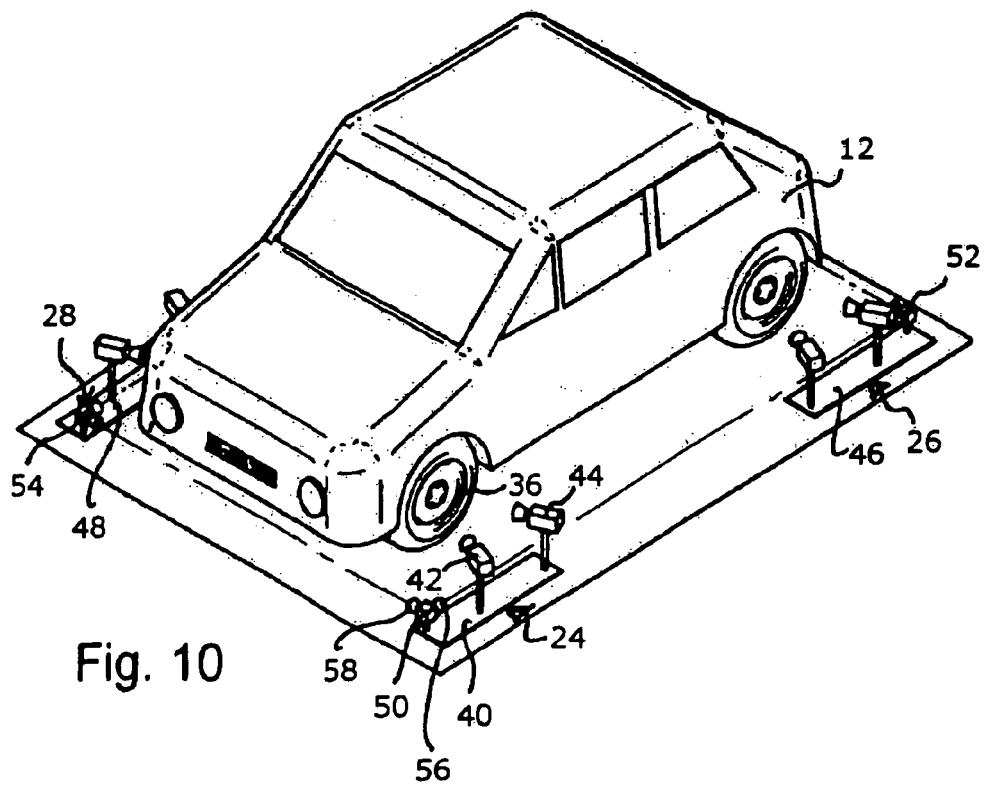
FIG. 10 shows a schematic representation of wheel alignment measuring system with stationary measuring units and reference system for adjustment of the measuring units between each other.

FIG. 9 shows a measuring site 10, on which a motor vehicle 12 stands whose running gears shall be measured. On the measuring site 10, four measuring units are statically arranged three of which measuring units 14,16,18 are shown while the fourth measuring unit is covered up through the motor vehicle. FIG. 10 shows a measuring site 20 with the motor vehicle 12 where again three measuring units 24, 26, 28 are shown, while the fourth measuring unit is covered up through the motor vehicle.

The measuring units 14,16,18 respectively include a ground plate 30 and two cameras 32, 34 which are arranged under different angles to the pertinent wheel 36 of the motor vehicle 12. In the embodiment of FIG. 9, the measuring units 14,16,18 are mounted fixedly on the measuring site 10 wherein the relative angle positions of the measuring units between each other as well as their distances are fixed by the mounting thereof and then remain unchanged.

In the embodiment of FIG. 10, the measuring units 24, 26, 28 again show a ground plate 40 and two cameras 42, 44 which are directed under different angles to the pertinent wheel 36. On the ground plates 40, 46, 48 of the measuring units 24, 26, 28 reference system measuring heads 50, 52, 54 are provided which allow an optical measurement of the relative angle positions and the distances of the measuring units 24, 26, 28 (and of the measuring unit covered up through the motor vehicle 12). For this purpose, each measuring head, for example the measuring head 50, has two transmitter/receiver units 56, 58 which are directed to the measuring head facing longitudinal to the wheel alignment or to the measuring head facing lateral with respect to the motor vehicle. With a reference system of such a kind, a roughly adjusted mounting of the measuring units 24, 26, 28 is sufficient, and the determination of the relative positions and the distances of the measuring units to each other can continuously be measured and also be re-adjusted.

The calibration of the stereo measuring system includes the calibration of the "inner camera parameters" and the calibration of the mounting position of the measuring unit. As "inner parameters" all parameters are denoted which are camera specific, i.e. that are fixed through the assembly of the camera. Inner parameters are fixed through the mounting position of the optical sensors, the objective and its mounting position, the aperture setting and focus setting. With zoom objectives the set focal length is additionally decisive. The inner parameters can be considered constant as long as no mechanical alteration on the camera or alteration of the objective setting has been made. The parameters are determined with the help of completely known objects. At present the calibration with a 3D object is preferred, as for example with an arrangement having many sufficiently prominent points and planar targets in different spatial positions.

The calibration of the mounting position upon mounting of two cameras in a measuring unit to form a stereo-measuring system, must be made with respect to the coordinates system of the measuring unit. For this purpose, respective mounting axles, installation surfaces and/or index pegs on the measuring unit are provided with respect to which both the installed reference measurement system as well as the stereo measurement system can be calibrated. Alternatively an optical calibration can be made.

The quality of the illumination is examined with the aid of the available measurement pictures. Therein, sufficient segmentability, i.e. the quality of the contrast of the shadow border line, is examined. If no sufficient segmentability is given, the illumination is adjusted.

The measurement of the reference system data is identical with the method in the known wheel alignment measuring system with exception of the distance measurement. Results of the measurement of the reference system are the position of the single measuring units with respect to each other, including distance and the position of the single measuring units to the perpendicular. The distance measurement is undertaken through the angle measurement of two light emitting diodes (LED's) having a known distance.

Sequence of the Measurements

Figure 11:
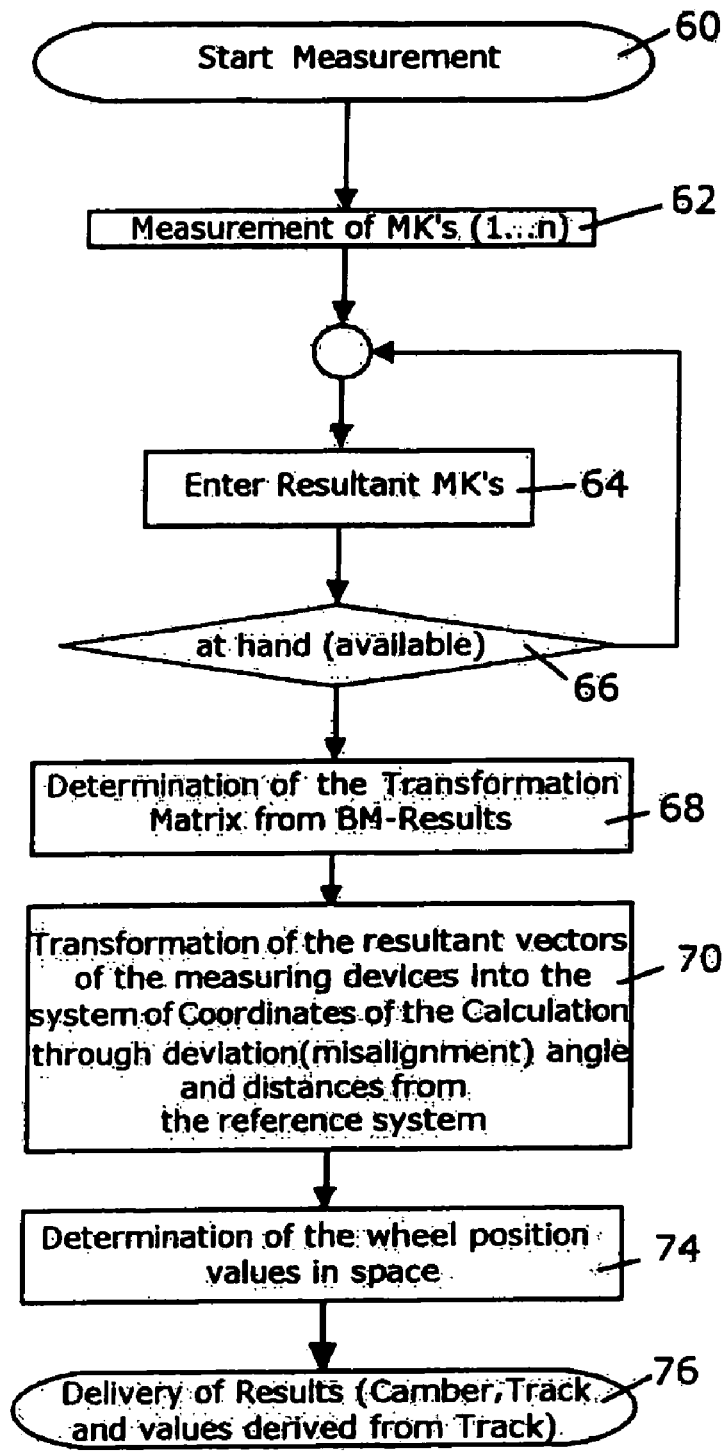
FIG. 11 shows a schematic total-flow chart diagram for the wheel alignment measurement of a motor vehicle.

FIG. 11 shows a schematic sequence flow chart of the measurement, wherein it is assumed that the above mentioned measurements of the reference systems and the calibration of the measuring unit are finished. In step 60 the measurement is started. Along with step 62, the measurements of the individual measuring units 14,16,18 or 24, 26, 28 are executed, wherein the measurement results are entered into a computer (not shown). In the steps 64, 66 the computer determines in the step 68 the transformation matrix from the results of the reference measurement (BM-results), that is from the results of the reference system measurement. In the step 70, the result vectors of the stereo measurement of the measuring units (MK) are transformed into the arithmetic coordinates system through offset angles and distances from the reference system (RKS-axis) wherein a coordinate system of the measuring unit is arbitrarily fixed as arithmetic coordinate system. In the step 71, the computer then determines the wheel position values in space, that means in particular the individual track angles of the front wheels, the so called geometric driving axis and the like as is customary with usual wheel alignment measuring systems. In doing this, the position of the result vectors to each other is evaluated in the arithmetical coordinates system, and, from that, the corresponding wheel alignment measurement values are calculated. In the step 76, finally, the results for the wheel position values, namely camber, track angle and the angle values derived from the track angles, are presented to a display arrangement and/or stored for further use.

Figure 12:
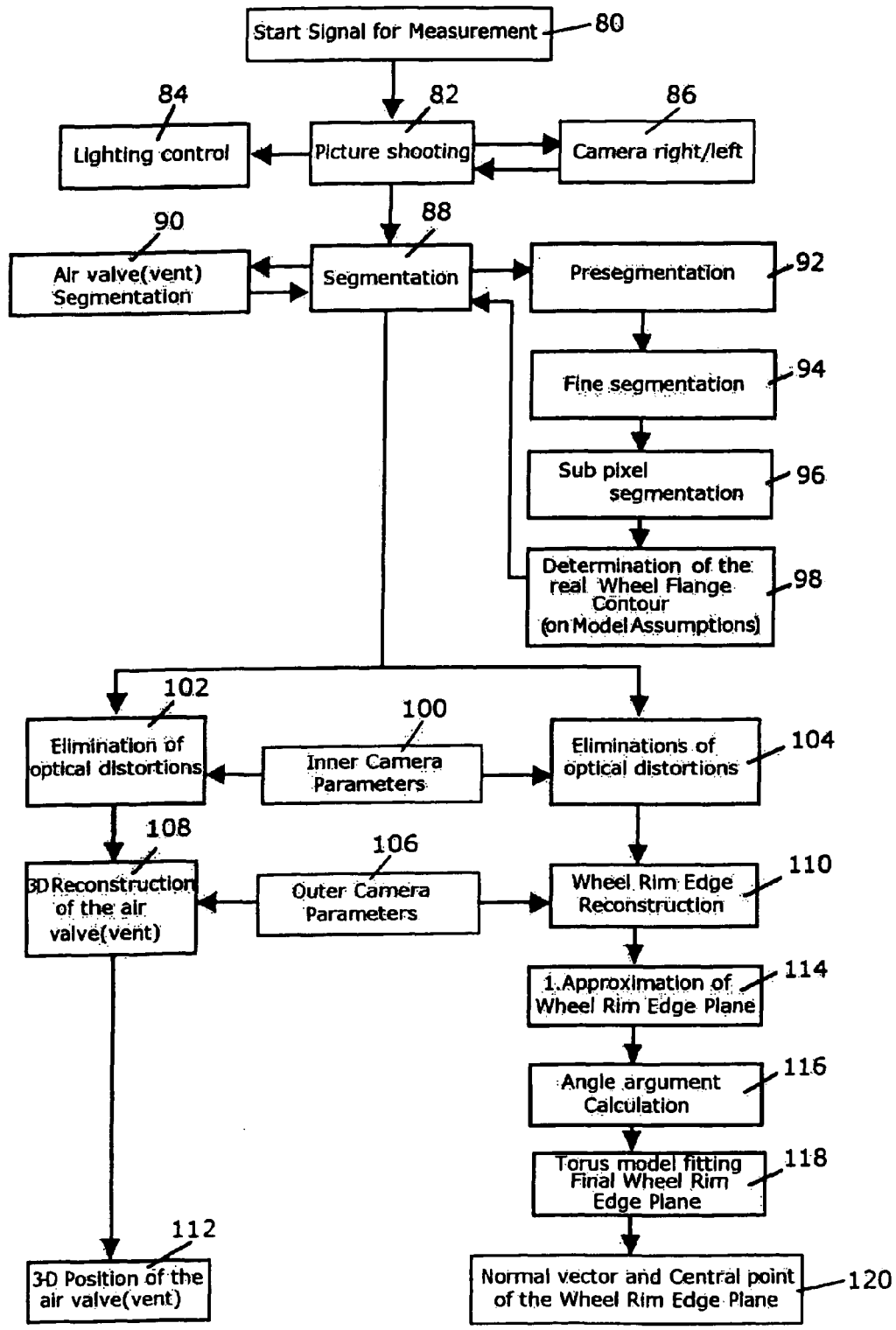
FIG. 12 shows a detailed total flow chart for the wheel alignment measurement of a motor vehicle.

FIG. 12 shows a sequence flow chart of the measurements in a measuring unit in somewhat greater detail. In the step 80, a start signal for the measurement is given. Thereupon, in step 82, the picture shooting is started, wherein firstly, in step 84, it is examined whether the illumination for the measurement is adequate and, if necessary, the illumination is adjusted. The adjustment can include a larger or smaller intensity of the light for the illumination where, in any case, the objective consists in obtaining as good a contrast as possible of the part of the rim observed by the camera or of the rim horn. In the step 86, the cameras that are arranged right or left in respect of the wheel axis, are active and serve both for examination of the illumination situation as well as for taking the stereo pictures of the wheel rim after completed setting of the illumination. In step 88, a segmentation of the rim is made, wherein, in step 90, a segmentation of the air valve of the motor vehicle wheel is made, that means the angle position of the air valve is determined. The steps 92 to 98 serve the segmentation of the rim edge, wherein, in step 92, a pre-segmentation, in step 94 a fine segmentation, in step 96, a sub-pixel segmentation and in step 98, a determination of the real rim edge contour with respect to the model assumption takes place. This segmentation is undertaken in order to measure out defined angle ranges of the rim edge and to be able to take into account the measured values when determining the rim edge plane.

In step 100, the measurement results obtained up to now, are re-calculated taking into account the inner camera parameters in order to eliminate, in the step 102, optical distortions in the determination of the position of the characteristic feature (e.g. air vent) and, in step 104, optical distortions with respect to the pictures of the rim edge. In step 106, in consideration of the outer camera parameters in step 108, the 3D position of the air valve is reconstructed and, in the step 110, the position of the rim edge is reconstructed. The result of the step 108 is the information about the 3D position of the air valve (step 112). For the rim edge reconstruction, in step 114, beforehand a first approximation of the rim edge plane is executed. Thereafter, in step 116, the angular argument is calculated, and, in step 118, a torus model fitting or the final determination of the rim edge plane, respectively, is made. In step 120, the result of the calculation, namely the normal vector and the central point of the rim edge plane, is displayed and/or stored for the further calculation. The results established in steps 112 and 120, are then further processed for calculation of the wheel position angle values as has been described with reference of FIG. 11 in the steps 68 to 76.

Figure 13:
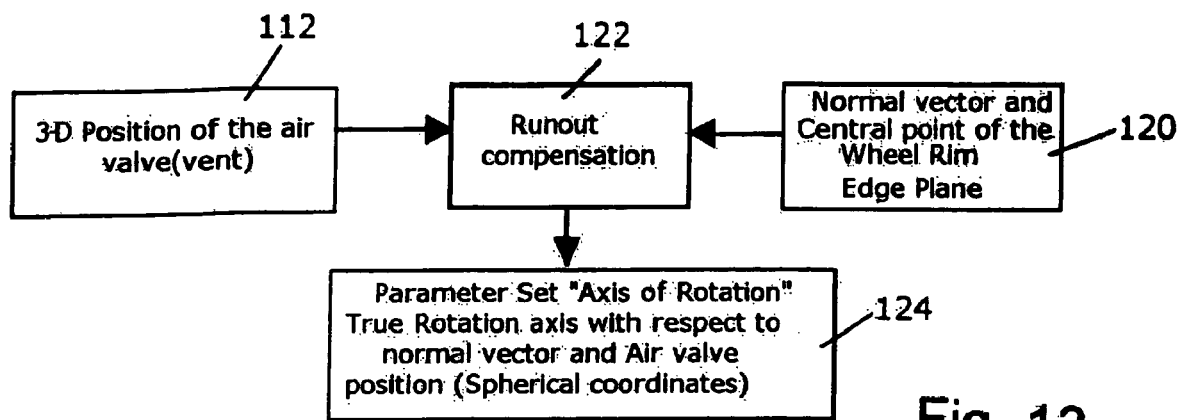
FIG. 13 shows a flow chart for the rim run out compensation or the determination of the true axis of rotation.

FIG. 13 shows a schematic sequence flow chart for the continuation of the method shown in FIG. 12 for the purpose of the rim run-out compensation. For rim run-out compensation in step 122, the results obtained in the steps 112 and 120 (FIG. 12) about the 3D position of the characteristic feature, e.g. of the air valve, or the normal vector and central point of the rim edge plane are considered in order to obtain a parameter set "axis of rotation", that means the true axis of rotation with respect to the normal vector and the air valve position in spherical coordinates. The measurement of the wheel rotation is required for the execution and checking of the rim run-out compensation, the determination of the king pin angle in the course of a turning angle measurement and the determination of changes of the caster during an adjustment of the caster. For the execution and checking of the rim run-out compensation a low accuracy of measurement is required. A resolution of the wheel rotation with about 10 angle minutes is adequate. In addition, an arbitrary rotation of the wheel should be detectable to the purpose of which the pursuit and measurement of the air valve is sufficient. The air valve is unique on the circumference and can be localized with corresponding accuracy.

For determination of the king pin angle in the course of a turning angle measurement and the determination of the changes of the castor at the adjustment of the castor, the wheel rotation is to be determined with an accuracy of at least 2 angle minutes. Nevertheless an arbitrary rotation of the wheel must not be detectable. For this purpose, the determination of the 3D position of the air valve can be executed. Alternatively the measurement and pursuance of non-rotating edges or structures or features in the rim can be executed wherein corresponding algorithms as for the rim edge determination can be used.

Figure 14:
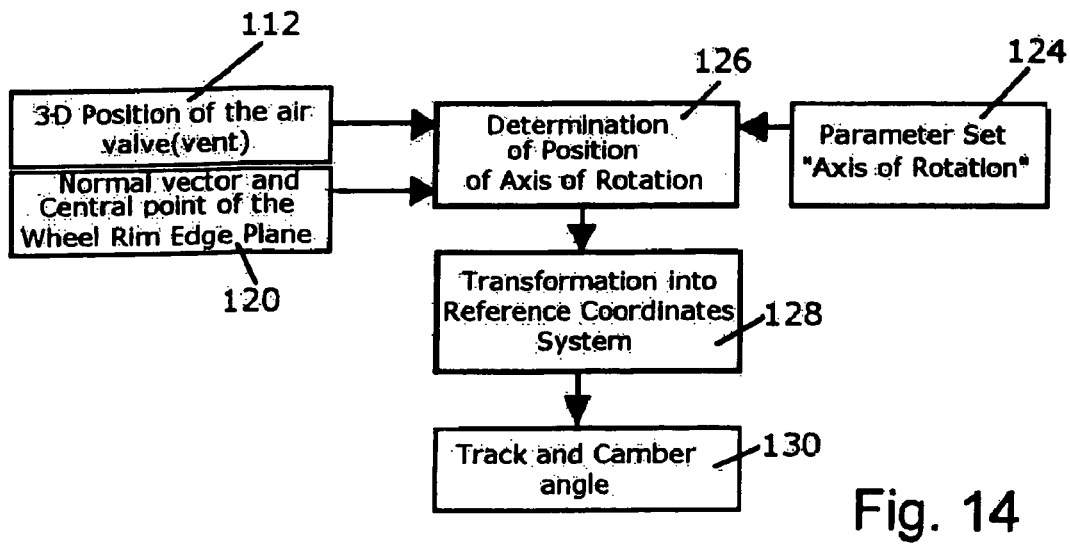
FIG. 14 shows a flow chart for the determination of the actual track and camber angle of the wheel.

FIG. 14 shows a schematic sequence flow chart for the calculation of the track angles and the camber angles from the results of steps 112 and 120 of the FIG. 12 and of the step 124 of FIG. 13, i.e. the final calculation of the track angles and camber angles while taking into account the rim run-out. In other words, the information about the 3D position of the air valve and the information about the normal vector and the central point of the rim edge plane as well as the parameter set "axis of rotation" is used in the step 126 for determining the position of the axis of rotation. The result of the step 126 is, in step 128, transformed into the reference coordinate system of the computer which consequently, in the step 130, calculates the track angles and camber angles.

In the following, the calculation bases for the calculation of the wheel alignment parameters are described.

| | Terms: | |
|---|---|---|
| BM | Reference measuring system | Presently available standard angle measurement system with its own coordinate system |
| Bmi | | A plurality of reference measuring systems positioned at respective wheels |
| KMK | Coordinates system MK | Right angled coordinate system. Origin in track LED of the camera 2 of the BM.<br>x-direction: alongside BM (not driving direction).<br>y-direction: axis taking up BM-wheel.<br>z-direction: opposite to earth gravitation denoted through apostrophe. |

| | -continued | |
|---|---|---|
| | Terms: | |
| KMKi | | Coordinate Systems of the respective measuring heads Mki |
| RKS | Arithmetic Coordinates system | Arbitrary but meaningfully fixed coordinate system for calculating of all MKs to obtain a wheel alignment measurement |
| i = 1 ... x | | Numbering 1 ... x of the individual systems is made corresponding to the present convention for measurement value receivers. |

| Measurement - and arithmetic quantities: | |
|---|---|
| dv | Distance MK's, transverse track, front |
| dh | Distance MK's, back |
| di | Distance MK's, left |
| dr | Distance MK's, right |
| A, B, C, D, E, F, G, H | Track angles of the reference system |
| I, K, L, M, N, O, P, Q | Inclination angles of the reference system |
| (x', y', z') | Vector in KMK (coordinate system of measuring unit) |
| (x'', y'', z'') | Vector parallel to the RKS (arithemetic coordinates system) |
| (x, y, z) | Vector in RKS (arithmetic coordinates system) |
| $(x_n, y_n, z_n)$ | Direction vector of the wheel axis, wheel outwards |

Result Vector

The individual stereo measuring system i has the following result vector in the coordinates system of the measuring unit (measuring head) i (KMKi)

$$\vec{e}'_i = \begin{pmatrix} x'_i \\ y'_i \\ z'_i \end{pmatrix} * \lambda_i \begin{pmatrix} x'_{in} \\ y'_{in} \\ z'_{in} \end{pmatrix};$$

Transformation into the RKS

The result vectors are transformed with the help of the results from the reference system into the arithmetic coordinates system.

Step 1:

Transformation of the result vectors into a horizontally leveled coordinates system and into a coordinates system, that lies parallel to RKS in all directions.

Combined Rotation of Cardanic Type:

$$\begin{pmatrix} x'' \\ y'' \\ z'' \end{pmatrix} = R_z(\tau) R_y(\kappa) R_x(\gamma) \begin{pmatrix} x' \\ y' \\ z' \end{pmatrix};$$

Step 2:

Displacement of the starting points of the vector in the RKS.

Therein the following offset angles are defined:
setting $KMK_4 = RKS$
Offset angle $KMK_2$ to $KMK_4$: $f_{24} = (F+D)/2$;

Offset angle $KMK_3$ to $KMK_4$: $f_{34}=(H+G)/2$;
Offset angle $KMK_1$ to $KMK_3$: $f_{13}=(E+C)/2$;

wherein,

C, E: track sensors left facing each other
D, F: track sensors right facing each other
G, H: track sensors back facing each other Displacement $KMK_2$ in RKS $$\begin{pmatrix} x_2 \\ y_2 \\ z_2 \end{pmatrix} = \begin{pmatrix} x_2'' \\ y_2'' \\ z_2'' \end{pmatrix} + \begin{pmatrix} d_r * \cos(\varphi_{24}) \\ d_r * \sin(\varphi_{24}) \\ 0 \end{pmatrix};$$

Displacement $KMK_3$ in RKS $$\begin{pmatrix} x_3 \\ y_3 \\ z_3 \end{pmatrix} = \begin{pmatrix} x_3'' \\ y_3'' \\ z_3'' \end{pmatrix} + \begin{pmatrix} -d_h * \sin(\varphi_{34}) \\ d_h * \cos(\varphi_{34}) \\ 0 \end{pmatrix} + \begin{pmatrix} w * (\cos(\tau_3) - 1) \\ w * \sin(\tau_3) \\ 0 \end{pmatrix};$$

Displacement $KMK_1$ in RKS $$\begin{pmatrix} x_1 \\ y_1 \\ z_1 \end{pmatrix} = \begin{pmatrix} x_1'' \\ y_1'' \\ z_1'' \end{pmatrix} + \begin{pmatrix} x_3 \\ y_3 \\ 0 \end{pmatrix} + \begin{pmatrix} d_l * \cos(\varphi_{13}) \\ d_l + \sin(\varphi_{13}) \\ 0 \end{pmatrix};$$

The above description of the preferred embodiments of the invention has been given for the purpose of explanation. The invention is not limited to the disclosed embodiments. Many possibilities and alterations of the embodiments are evident to a man skilled in the art with reference to the above disclosure, and the scope of protection of the invention is defined only by the enclosed claims.

What is claimed:

1. A computer-implemented method for determining the spatial position of wheel rim to a measuring unit, that includes at least one camera, wherein the wheel rim lies in the viewing field of the camera, the method comprising:
    making available of a model that describes a model body of a localizable wheel rim geometry detail as well as the spatial position of the model body to the measuring unit through model parameters,
    capturing of a picture of the wheel rim geometry detail of the wheel rim with the camera,
    fitting, by the computer, of the picture of the model body resulting from the model parameters to the picture of the rim geometry detail through changing the model parameters of the model, and
    tracking, by the computer, the changes of the model parameters of the model upon the fitting, wherein the data related to the position of the model body of the wheel rim geometry detail reflect the spatial position of the wheel rim geometry detail and, thereby, of the wheel rim itself, when the image resulting from the model parameters of the model body of the wheel rim geometry detail matches to the captured picture of the wheel rim geometry detail within the asserted tolerance limits.

2. The method according to claim 1, wherein the model body is a so-called osculating torus or a 3D-CAD representation.

3. The method according to claim 2, wherein, in case of the osculating torus, model parameters of the model are a primary radius R and a secondary radius r of the torus, a position c of the torus center, a normal vector n of the plane of rotation of the torus and a position z of the projection center of an aperture camera, with which the osculating torus is viewed.

4. The method according to claim 1, wherein the wheel rim geometry detail is the shadow border line of the rim edge contour.

5. The method according to claim 4, wherein the position of the wheel rim in space is determined by
    capturing the shadow border line by at least one camera;
    calculating from the shadow border line an extreme shadow border line curve;
    calculating from the extreme shadow border line curve an axes through an orthogonal projection, which axes is perpendicular to a plane spread out by the wheel rim.

6. The method according to claim 1, wherein the wheel rim contour is captured with two cameras which are directed to the wheel at different angles.

7. The method according to claim 1, wherein the picture of the wheel rim is used for determining an angular rotation reference point on the rim.

8. The method according to claim 7, wherein, for determination of the rotation angle-reference point on the rim, the position of a characteristic feature on the wheel is used.

9. The method according to claim 8, wherein a characteristic feature on the rim is used as a characteristic feature for determination of the rotation angle-reference point.

10. The method according to claim 8, wherein, an air valve of the wheel is used as the characteristic feature for determination of the rotation angle-reference point.

11. The method according to claim 7, wherein, for segmentation of the perimeter of the rim, a pre-segmentation and a fine segmentation is carried out.

12. The method according to claim 11, wherein, in addition to the pre-segmentation and fine segmentation, a sub-pixel segmentation is carried out.

13. The method according to claim 1, wherein the fitting of the image of the model body of the wheel rim geometry detail to the picture of the wheel rim geometry detail through alteration of model parameters of the model includes, at first, an approximation of a rim edge plane, then an angle argument calculation and lastly a final torus model fitting on the final rim edge plane is carried out.

14. The method according to claim 1, further comprising:
    outputting or displaying data with respect to the model parameters of the model which define the spatial position of the wheel rim when the image of the model body of the wheel rim geometry detail fits to the captured picture of the wheel rim geometry detail.

15. The method according to claim 1, further comprising:
    starting the picture shooting;
    segmenting the rim wherein a segmentation of the air vent of the motor vehicle is carried out;
    segmenting the rim edge in order to measure the asserted angle range of the rim edge;
    reconstructing the 3-D position of the rim edge; and
    displaying the results of the calculation, namely of the normal vector and of the central point of the rim edge plane and/or storing of the same for the further calculation.

16. The method according to claim 15, wherein the position of a characteristic feature is reconstructed while considering the outer camera parameters in order to obtain a parameter set axis of rotation, that is the true axis of rotation with respect to the normal vector.

17. The method according to claim 15, wherein, after the start of the picture shooting, it is examined at first whether the illumination is sufficient for the measurement, and that the illumination is adjusted accordingly.

18. The method according to claim 15, wherein the adjustment includes a larger or smaller intensity of the light for the illumination.

19. A measuring unit for determining the spatial position of a wheel rim with respect to a measuring device wherein
said measuring device includes at least one camera arranged with respect to the wheel rim such that the wheel rim lies in the viewing field of the camera for capturing of a picture of the wheel rim geometry detail of the wheel rim with the camera, and wherein
said measuring unit further comprises computer means configured to making available of a model that describes a model body of a localizable wheel rim geometry detail as well as the spatial position of the model body to the measuring device through model parameters, and further configured to fitting of the picture of the model body resulting from the model parameters to the picture of the rim geometry detail through changing the model parameters of the model, and tracking the changes of the model parameters of the model upon the fitting, wherein
the data related to the position of the model body of the wheel rim geometry detail reflect the spatial position of the wheel rim geometry detail and, thereby, of the wheel rim itself, when the image resulting from the model parameters of the model body of the wheel rim geometry detail matches to the captured picture of the wheel rim geometry detail within the asserted tolerance limits.

20. The measuring unit according to claim 19, wherein two cameras are provided which capture the perspective picture of the wheel rim contour and are directed to the wheel under different angles.

21. The measuring unit according to claim 20 wherein, in case of Zoom-objectives, furthermore the set focal length is pre-adjusted.

22. The measuring unit according to claim 19, wherein each camera includes an optical sensor, an objective, an aperture setting unit and a focus setting unit, and that the mounting position of the sensors and of the objective, the aperture setting and focus setting are pre-adjusted.

23. The measuring unit according to claim 22, wherein an output or display system, respectively, is provided for outputting or displaying, respectively, the data with respect to the model parameters, which define the spatial position of the wheel rim, when the image of the model body of the wheel rim-geometry detail fits to the captured picture of the wheel rim geometry detail.

24. A computer-implemented method for the wheel alignment measurement on motor vehicles, comprising:
determining the spatial position of wheel rim with respect to a measuring device, that includes at least one camera, wherein the wheel rim lies in the viewing field of the camera, wherein the determining the spatial position of the wheel rim includes:
making available of a model that describes a model body of a localizable wheel rim geometry detail as well as the spatial position of the model body with respect to a measuring device in a measuring unit through model parameters,
capturing of a picture of the wheel rim geometry detail of the wheel rim with the camera,
fitting, by the computer, of the picture of the model body resulting from the model parameters to the picture of the rim geometry detail through changing the model parameters of the model, and
tracking, by the computer, the changes of the model parameters of the model upon the fitting, wherein
the data related to the position of the model body of the wheel rim geometry detail reflect the spatial position of the wheel rim geometry detail and, thereby, of the wheel rim itself, when the image resulting from the model parameters of the model body of the wheel rim geometry detail matches to the captured picture of the wheel rim geometry detail within the asserted tolerance limits, and
determining the relative positions of the measuring units for execution of the measurements, and
expressing the measuring results of the measurements on the wheels of the motor vehicle in terms of wheel position values taking into account the relative positions of the measuring units, and
outputting or displaying the wheel position values.

25. The method according to claim 24 wherein the relative positions of the measuring units for the execution of the measurements are fixed through an adjustable mounting of the measuring units on a measuring site.

26. The method according to claim 25, wherein the relative positions of the measuring units for execution of the measurements are determined through a reference system that is arranged between the measuring units.

27. The method according to claim 24, further comprising:
measuring the individual measuring units;
entering the measuring results into a computer;
calculating the transformation matrix from the results of the reference system measurement;
transforming the result vectors of the measuring units into the arithmetic coordinates system through offset angles and distances from the reference measuring system;
determining the wheel position values in the arithmetic coordinates system through evaluation of the position of the result vectors to each other for calculation of the corresponding wheel alignment measurement values; and
presenting the results to the wheel position angle values to a display system and/or storing of the same for further use.

28. A wheel alignment measuring system for motor vehicles, comprising:
measuring units for determining the spatial position of a wheel rim with respect to a measuring device wherein
said measuring device includes at least one camera arranged with respect to the wheel rim such that the wheel rim lies in the viewing field of the camera for capturing of a picture of the wheel rim geometry detail of the wheel rim with the camera, and wherein
said measuring units are positioned on a measuring site in such a manner that a measuring unit each is associated with one of the wheels of the motor vehicle whereby the relative positions of the measuring units are determined during the execution of the measurements,
said system further comprising computer means configured to making available of a model that describes a model body of a localizable wheel rim geometry detail as well as the spatial position of the model body to the measuring device through model parameters, and further configured to fitting of the picture of the model body resulting from the model parameters to the picture of the rim geometry detail through changing the model parameters of the model, and tracking the changes of the model parameters of the model upon the fitting, wherein the data related to the position of the model body of the wheel rim geometry detail reflect the spatial position of the wheel rim geometry detail and, thereby, of the wheel rim itself, when the image resulting from the model parameters of the model body of the wheel rim geometry detail matches to the captured picture of the wheel rim geometry detail within the asserted tolerance limits said computer means furthermore processing the measurement results of the measurements on the wheels of the motor vehicle to wheel position values taking into account the relative positions of the measuring units, and an output or display device which outputs or displays the wheel position values.

29. The wheel alignment measuring system according to claim 28, wherein the relative positions of the measuring units for execution of the measurements are fixed through an adjustable mounting of the measuring units at a measuring site.

30. The wheel alignment measuring system according to claim 28, wherein the relative positions of the measuring units for execution of the measurement are determined through a reference system, that is arranged on the measuring units.

31. The wheel alignment measuring system according to claim 28, wherein, upon combined assembly of two cameras in a measuring unit for a stereo-measuring system, the cameras are calibrated with respect to the coordinates system of the measuring unit.

* * * * *